April 7, 1942.   P. B. REEVES   2,278,739
SPEED-VARYING DRIVE
Filed April 10, 1939
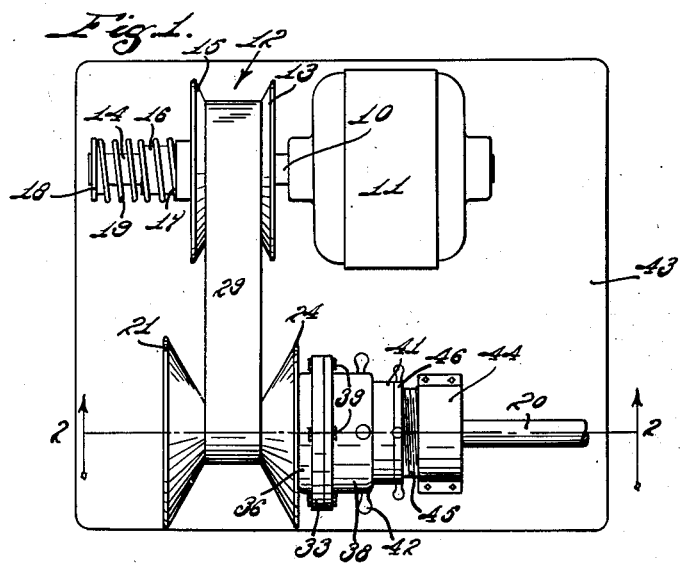
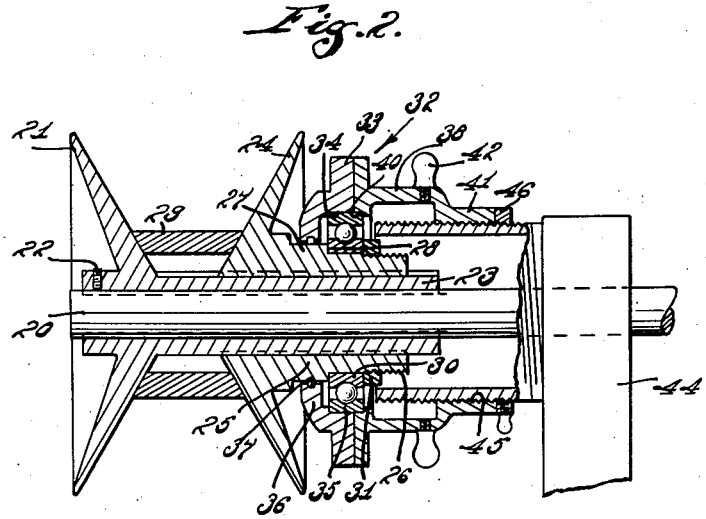
INVENTOR.
Paul B. Reeves,
BY
Hood + Hahn.
ATTORNEYS.

Patented Apr. 7, 1942

2,278,739

UNITED STATES PATENT OFFICE 2,278,739

SPEED-VARYING DRIVE

Paul B. Reeves, Columbus, Ind., assignor to Reeves Pulley Company, Columbus, Ind., a corporation of Indiana Application April 10, 1939, Serial No. 266,978

3 Claims. (Cl. 74—230.17)

The present invention relates to a speed varying drive, and the primary object of the invention is to provide a simple, but effective drive of the character indicated which shall be exceedingly compact, and therefore adaptable to uses where space is limited. The invention pertains primarily to the means for adjusting the speed ratio of a drive of the type comprising one positively adjustable V-pulley and one resiliently expansible V-pulley.

Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a plan view of one embodiment of my invention; and

Fig. 2 is an enlarged transverse section taken substantially on the line 2—2 of Fig. 1.

Referring more particularly to the drawing, it will be seen that I have indicated a power input shaft 10 which, in the illustrated embodiment of the invention, is the spindle of an electric motor 11. Upon said spindle is mounted a V-pulley indicated generally by the reference numeral 12 and comprising a coned disc 13 fixed to the spindle 10 and provided with an elongated hub 14 projecting from its coned face. Upon said hub 14 is splined a mating disc 15 provided with a hub 16 projecting from its outer face and formed with an enlargement providing a shoulder 17 between which, and an abutment 18, mounted on the hub 14, is engaged a coiled spring 19 constantly urging said disc 15 toward the disc 13.

I have indicated also a power output shaft 20 upon which is mounted an expansible V-pulley comprising a disc 21 fixed to said shaft 20 by a set screw 22 or the like and provided with an elongated hub 23 projecting from its coned face; a mating disc 24 being splined upon said hub 23. The disc 24 is formed with a hub 25 projecting from its outer face, said hub 25 being threaded adjacent its extremity, as at 26; and being formed with an enlargement 27 adjacent the disc and providing an outwardly facing shoulder 28.

An edge-active belt 29 provides a driving connection between the pulley 12 and the pulley formed by the discs 21 and 24.

The inner race 30 of a thrust bearing is mounted upon the hub 25 in engagement with the shoulder 28, being held in place by a nut 31 threadedly received upon the portion 26 of the hub 25. A housing for said bearing is indicated generally by the reference numeral 32.

Said housing comprises an element 33 formed with a seat 34 receiving a portion of the outer race 35 of said thrust bearing, said seat 34 engaging not only a part of the periphery of said race, but also that face of said race adjacent the disc 24. Said element 33 is further formed with a radially inwardly projecting flange 36 extending substantially into contact with the enlarged portion 27 of the hub 25 and formed with an oil retaining groove 37 adapted to entrap oil or grease which may tend to work itself across the surface 27.

A second element 38 completes the housing 32, being secured to the element 33 by bolts 39 or the like. Said element 38 is formed to provide a seat 40 receiving a portion of the periphery of the outer bearing race 35, and engaging that face of said race remote from the disc 24. The element 38 is further formed with an internally threaded sleeve 41 projecting axially away from the disc 24; and may preferably be provided with knobs 42 to facilitate rotation of the housing 32.

In the illustrated embodiment of the invention, I have provided a base 43 upon which are mounted the motor 11 and a standard 44 which may provide a bearing for an extension of the shaft 20, and which further supports a stationarily mounted externally threaded thimble 45 which encases a portion of said shaft 20 and which is coaxial with said shaft 20. The sleeve 41 is adjustably threadedly mounted upon the thimble 45.

It will be obvious that, if the housing 32 is rotated in a clockwise direction as viewed from the right-hand side of Fig. 1, threaded engagement between the sleeve 41 of the thimble 45 will cause said housing to move toward the left. Since the housing 32 is fixed with respect to the bearing race 35, and since the bearing race 30 is fixed with respect to the hub 25, such movement of the housing will carry with it the disc 24; thereby squeezing the belt 29, by a wedging action, outwardly between the discs 24 and 21. Such action will pull the belt 29 more deeply into the V between the discs 13 and 15, forcing the disc 15 to move toward the left against the tendency of the spring 19; and thereby reducing the speed of the shaft 20. Conversely, if the housing 32 is rotated in the opposite direction, the disc 24 will be backed away from the disc 21 to permit the belt 29 to move more deeply into the V between said discs, allowing the tendency of the spring 19 to shift the disc 15 toward the disc 13 to wedge the belt 29 outwardly between said discs 15 and 13, to increase the speed of the shaft 20.

Obviously, the elements 11 and 44 need not be mounted upon a unitary base, but may be supported in proper relation upon any foundation. For instance, the motor 11 might be mounted upon a floor, and the element 44, supporting the thimble 45, might be mounted upon a wall.

Preferably a jam nut 46, with or without the indicated operating knobs, will be provided to hold the housing 32 against undesired disturbance due to the rotation of the hub 25.

I claim as my invention:

1. A speed-varying drive comprising a power input shaft, a power output shaft having an extension, a resiliently expansible V-pulley on said power input shaft, an expansible V-pulley on said power output shaft and comprising a coned disc fixed to said power output shaft and having an elongated hub projecting from its coned face, and a mating coned disc splined on said hub, and having a hub projecting from its outer face, a belt providing a driving connection between said pulleys, a thrust bearing having its inner race fixed to the hub of said last-mentioned disc, a housing for said bearing fixed with respect to the outer race thereof, said housing being formed with an internally threaded sleeve projecting away from said last-mentioned disc, and a stationarily mounted externally threaded thimble encasing at least a portion of the extension of said power output shaft, said sleeve being adjustably threadedly mounted on said thimble.

2. A speed-varying drive comprising a power input shaft, a power output shaft, a resiliently expansible V-pulley on said power input shaft, an expansible V-pulley on said power output shaft and comprising a coned disc fixed to said power output shaft and having an elongated hub projecting from its coned face, and a mating coned disc splined on said hub, and having a hub projecting from its outer face, said hub being threaded at its outer end, and being formed with an enlarged portion adjacent said disc, a belt providing a driving connection between said pulleys, a thrust bearing having its inner race mounted upon the hub of said last-mentioned disc in contact with the shoulder formed by said enlargement, a stop element threadedly mounted on said hub and engaging said race, a two-part housing for said bearing, one part of said housing providing a seat for a portion of the outer race of said bearing and engaging that face of said race adjacent said last-mentioned disc, and being formed with a radially inwardly projecting flange substantially engaging said hub enlargement and formed with an oil-retaining groove facing said enlargement, and the other part of said housing providing a seat for a part of said outer bearing race and engaging that face of said race remote from said last-named disc and being formed with an internally threaded sleeve projecting axially away from said last-mentioned disc, and an externally threaded thimble stationarily mounted adjacent said last-named disc, said sleeve being adjustably threadedly mounted on said thimble.

3. A speed-varying drive comprising a power input shaft and a power output shaft, a resiliently expansible V-pulley on one of said shafts, an expansible V-pulley on the other of said shafts, said other shaft having an extension, said last-mentioned V-pulley comprising a coned disc fixed to said other shaft and having an elongated hub projecting from its coned face, and a mating coned disc splined on said hub, and having a hub projecting from its outer face, a belt providing a driving connection between said pulleys, a thrust bearing having its inner race fixed to the hub of said last-mentioned disc, a housing for said bearing fixed with respect to the outer race thereof, said housing being formed with an internally threaded sleeve projecting away from said last-mentioned disc, and a stationarily mounted externally threaded thimble encasing at least a portion of the extension of said other shaft, said sleeve being adjustably threadedly mounted on said thimble.

PAUL B. REEVES.